US012346442B2

(12) United States Patent
Briliauskas et al.

(10) Patent No.: US 12,346,442 B2
(45) Date of Patent: *Jul. 1, 2025

(54) SYSTEM AND METHOD FOR COMPUTER SECURITY AUGMENTED DATA SET ALGORITHM TRAINING

(71) Applicant: UAB 360 IT, Vilnius (LT)

(72) Inventors: Mantas Briliauskas, Vilnius (LT); Aleksandr Ševčenko, Vilnius (LT)

(73) Assignee: UAB 360 IT, Vilnius (LT)

( * ) Notice: Subject to any disclaimer, the term of this patent is extended or adjusted under 35 U.S.C. 154(b) by 247 days.

This patent is subject to a terminal disclaimer.

(21) Appl. No.: 18/203,462

(22) Filed: May 30, 2023

(65) Prior Publication Data

US 2023/0342466 A1 Oct. 26, 2023

Related U.S. Application Data

(63) Continuation-in-part of application No. 17/728,518, filed on Apr. 25, 2022, now Pat. No. 11,663,334.

(51) Int. Cl.
G06F 21/56 (2013.01)

(52) U.S. Cl.
CPC .......... *G06F 21/565* (2013.01); *G06F 21/563* (2013.01); *G06F 2221/033* (2013.01)

(58) Field of Classification Search
None
See application file for complete search history.

(56) References Cited

U.S. PATENT DOCUMENTS

| | | | | |
|---|---|---|---|---|
| 11,210,397 B1* | 12/2021 | Sharif | ..... | G06F 21/566 |
| 2016/0048683 A1* | 2/2016 | Sanders | ..... | H04L 63/145 |
| | | | | 726/23 |
| 2018/0018459 A1* | 1/2018 | Zhang | ..... | G06F 21/566 |
| 2018/0183815 A1* | 6/2018 | Enfinger | ..... | H04L 63/145 |
| 2018/0203998 A1* | 7/2018 | Maisel | ..... | G06F 21/56 |
| 2018/0211140 A1* | 7/2018 | Davis | ..... | G06F 21/561 |

(Continued)

OTHER PUBLICATIONS

Botacin et al., "RevEngE is a dish served cold: Debug-Oriented Malware Decompilation and Reassemly," 2019, ACM, 12pg. (Year: 2019).*

(Continued)

*Primary Examiner* — Ryan D. Coyer
(74) *Attorney, Agent, or Firm* — Moser Taboada

(57) ABSTRACT

A method, apparatus and system for data augmentation include receiving a first plurality of binary files each having a first binary structure and including one or more known files containing malicious content and one or more known files not containing malicious content, altering a source code of each of the first plurality of binary files to produce a second plurality of binary files each having a second binary structure that is different from the first binary structure, wherein each altered binary file is functionality similar to the corresponding file in the first plurality of binary files from which it was produced, using the first and second plurality of binary files to train the AM machine learning model to distinguish between binary files containing malicious content and binary files not containing malicious content, and applying the trained AM machine learning model to identify unknown binary files containing malicious content.

20 Claims, 5 Drawing Sheets

(56) References Cited

U.S. PATENT DOCUMENTS

| | | | |
|---|---|---|---|
| 2019/0108338 A1* | 4/2019 | Saxe | G06F 21/563 |
| 2020/0092306 A1* | 3/2020 | Jusko | G06F 16/285 |
| 2021/0048993 A1* | 2/2021 | Burke | H04L 63/1408 |
| 2022/0083659 A1* | 3/2022 | Ma | G06N 20/20 |
| 2022/0147815 A1* | 5/2022 | Conwell | H04L 63/1416 |

OTHER PUBLICATIONS

Botacin et al., "RevEngE is a dish served cold: Debug-Oriented Malware Decompilation and Reassembly," 2019.

* cited by examiner

SYSTEM AND METHOD FOR COMPUTER SECURITY AUGMENTED DATA SET ALGORITHM TRAINING

CROSS-REFERENCE TO RELATED APPLICATIONS

This application claims benefit of U.S. patent application Ser. No. 17/728,518 filed Apr. 25, 2022, and issued as U.S. Pat. No. 11,663,334 on May 30, 2023, which is herein incorporated by reference in its entirety.

FIELD

The invention relates generally to computer security and antimalware solutions, and more particularly to data augmentation used in training an anti-malware (AM) machine learning model.

BACKGROUND

Data augmentation is a strategy that enables practitioners to significantly increase the diversity of data available for training models, without actually collecting new data. Data augmentation techniques such as cropping, padding, and horizontal flipping are used to train large neural networks. However, data augmentation is difficult in Antimalware (AM) solutions since the base material is typically binary code and it does not yield to simple manipulation to expand the training data set.

Thus, there is a need for improved data augmentation systems and methods for use in training AM machine learning models/algorithms.

SUMMARY

Systems and methods for data augmentation used in training an anti-malware (AM) machine learning model are provided herein. In some embodiments, a method for data augmentation may include receiving a first plurality of binary files each having a first binary structure, wherein the first plurality of binary files include one or more known malicious files and one or more known benign files; modifying the binary structure of each of the first plurality of binary files to produce a second plurality of binary files each having a second binary structure that is different from the first binary structure, and wherein each modified binary file is functionality similar to the corresponding file in the first plurality of binary files from which it was created; using the first and second plurality of binary files to train an AM machine learning model as to which files are malicious and which files are benign; and using the trained AM machine learning model to identify new malicious files.

In other method embodiments, the method includes receiving files that are known to be both malicious and benign from at least one of external sources and internal sources; altering each file's binary structure, wherein altering the a file's binary structure may include decompiling or reverse engineering the binary to reproduce the source code, or obtaining the source by some other means, and recompiling using different compiler options or different compilers, and whereas each altered file binary structure creates a larger data set than that of the files as originally received and each altered file is functionality similar to the received file and each altered file's status as malicious or benign matches each respective received file's status as malicious or benign; using the larger data set to train a machine learning algorithm what files are malicious and what files are benign as the larger data set improves the accuracy of the machine learning algorithm compared to training the machine learning algorithm using just the files as originally received; and providing a report via the input/output device based upon the machine learning algorithm's determination.

Other and further embodiments in accordance with the present principles are described below.

BRIEF DESCRIPTION OF THE DRAWINGS

So that the manner in which the above recited features of the present principles can be understood in detail, a more particular description of the principles, briefly summarized above, may be had by reference to embodiments, some of which are illustrated in the appended drawings. It is to be noted, however, that the appended drawings illustrate only typical embodiments in accordance with the present principles and are therefore not to be considered limiting of its scope, for the principles may admit to other equally effective embodiments.

Figure 1:
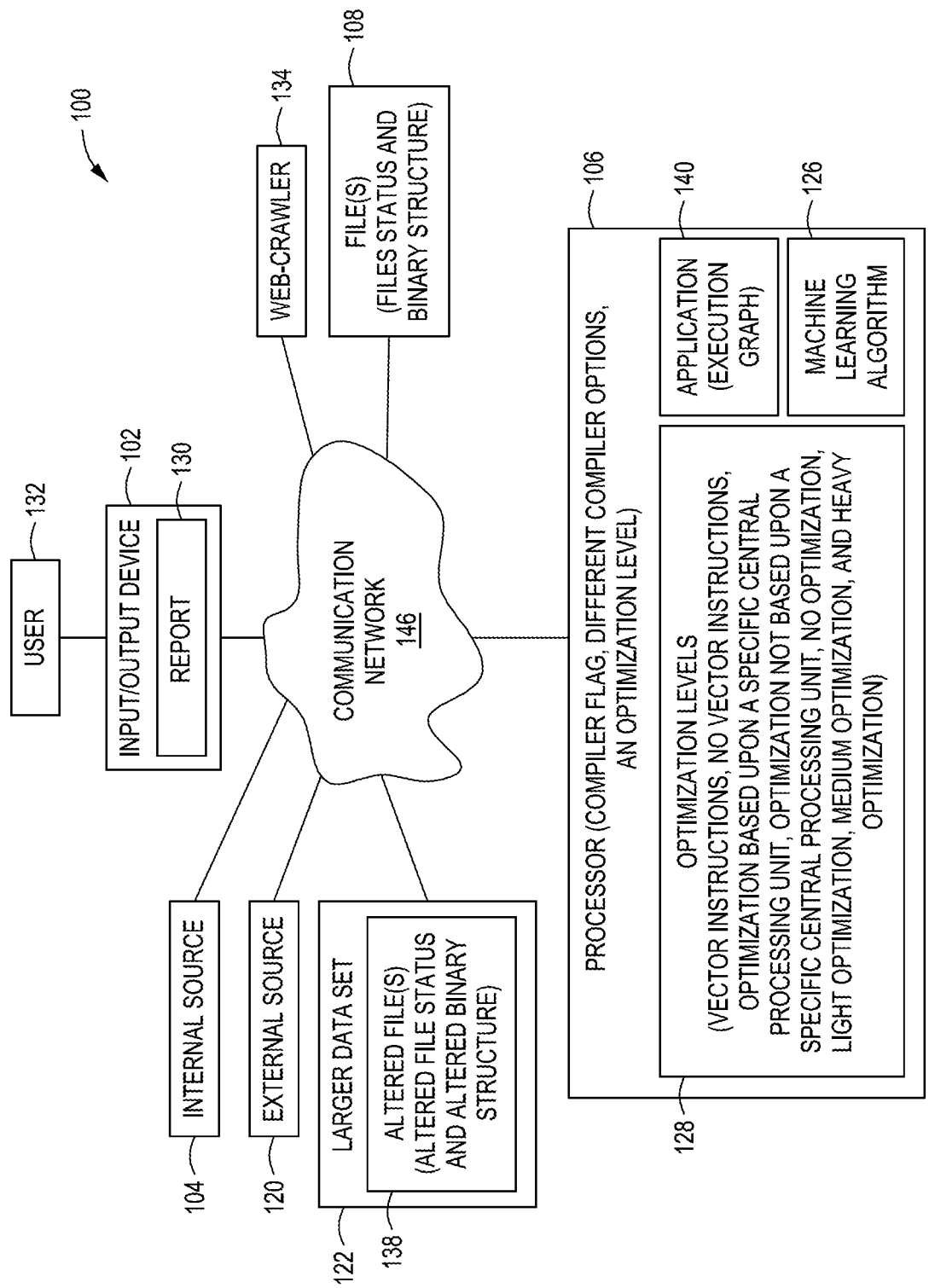
FIG. 1 depicts a high-level block diagram of a network architecture of a system for data augmentation used in training an anti-malware (AM) machine learning model in accordance with an embodiment of the present principles.

To facilitate understanding, identical reference numerals have been used, where possible, to designate identical elements that are common to the figures. The figures are not drawn to scale and may be simplified for clarity. It is contemplated that elements and features of one embodiment may be beneficially incorporated in other embodiments without further recitation.

DETAILED DESCRIPTION

The following detailed description describes techniques (e.g., methods, processes, and systems) for data augmentation used in training an anti-malware (AM) machine learning model. While the concepts of the present principles are susceptible to various modifications and alternative forms, specific embodiments thereof are shown by way of example in the drawings and are described in detail below. It should be understood that there is no intent to limit the concepts of the present principles to the particular forms disclosed. On the contrary, the intent is to cover all modifications, equivalents, and alternatives consistent with the present principles and the appended claims.

Data augmentation is a strategy that enables practitioners to significantly increase the diversity of data available for training models, without actually collecting new data. Methods and systems are described herein to achieve data augmentation in AM solutions by, for example in some embodiments, decompiling and recompiling binary code with different flags thus producing a different structure. In other embodiments, data augmentation may be achieved by performing a binary code analysis that extracts compilation instructions, modifies the instructions, and recompiles the files. Still other embodiments described herein may use execution graphs and/or machine learning based code trees to produce additional binary files for data augmentation used in training an anti-malware (AM) machine learning model.

FIG. 1 depicts a high-level block diagram of a network architecture of a system 100 for data augmentation used in training an anti-malware (AM) machine learning model in accordance with an embodiment of the present principles. In the embodiment of FIG. 1, the system 100 includes an input/output device 102, and a processor 106 programmed to receive files 108 that are known to be both malicious and benign from at least one of external sources 120, e.g. files on the Internet, and internal sources 104, e.g. files from a user's 132 database running system 100. The processor 106 also alters each file's 108 binary structure, wherein altering the file's binary structure may include decompiling or reverse engineering the binary to reproduce the source code, or obtaining the source code by some other means, and recompiling using different compiler options or different compilers. In some embodiments, the different compiler options are different optimization levels 128 that may include at least one of vector instructions, no vector instructions, optimization based upon a specific central processing unit, optimization not based upon a specific central processing unit, no optimization, light optimization, medium optimization, and heavy optimization, which results in additional altered files 138. By doing this, each altered file 138 binary structure creates a larger data set 122 than that of the files 108 as originally received and each altered file is functionality similar to the received file and each altered file's status as malicious or benign matches each respective received file's status as malicious or benign. The processor 106 additionally uses the larger data set 122 to train a machine learning algorithm 126 what files 108 and 138 are malicious and what files are benign as the larger data set improves the accuracy of the machine learning algorithm compared to training the machine learning algorithm using just the files 108 as originally received. In other words, the larger data set 122 is advantageous because the machine learning algorithm 126 has more examples to work with and that helps to improve the accuracy of the machine learning algorithm 126. The processor 106 also provides a report 130 via the input/output device 102 based upon the machine learning algorithm's 126 determination.

For example, the alteration of a benign file 108 to become an altered file 138 may be flagged by some computer security systems as malware because it has a different form even though it is functionally equivalent to the original benign file 108. Consequently, machine learning algorithm 126 should be exposed to as many structural variations of the original benign file 108 as is reasonable so that it can make a more trusted determination when faced with files 108 of varying format. By doing this, the system 100 can advantageously protect and train against malware that evades detection by inserting garbage or benign code into itself to fool machine learning models. The system 100 can advantageously account and train for this by altering the benign file 108 being analyzed in much the same way, before training.

In some embodiments, each altered file 138 has at least one of different data inside, different byte size, different hash codes, and different instructions, than the corresponding binary file from the first plurality of binary files from which it was created, but functionally, each altered file is the equivalent of the original file 108. In other words, altered files 138 are structurally different from a respective file 108, but are functionally equivalent to the respective file 108.

In some embodiments, the binary analysis alters the compiled binary assembly code of a received file 108 to produce a different binary that is equivalent in performance, in terms of functionality and/or in terms of speed of execution, as the original compiled binary assembly code. In other embodiments, the received file 108 is altered by at least one of extracting an execution graph based upon the code instructions and modifying the execution graph, and/or modifying the binary assembly code to change the branching. In some embodiments, once the execution graph is modified, the assembly from the execution graph is rebuilt.

In some embodiments, the received file's 108 decompiled code is directed to the machine learning algorithm 126 and the machine learning algorithm alters the received file's decompiled code, which is then rebuilt by one or more compilers. In other embodiments, the execution graph can be generated by an application that tracks the received file's processes (e.g. application 140) thus enabling the received file's binary structure to be altered by adjusting the assembly code.

In some embodiments, the file 108 is selected by at least one of a user 132 and a web-crawler 134. For example, the web-crawler 134 is pulling down files 108 from external sources continuously to generate the largest data set of files it can for system 100. In some embodiments, the web-crawler 134 may obtain opensource code as a source of benign application code that can later be modified in various ways as described above.

In one embodiment, the system 100 communicates over a communications network 146, which enables a signal to travel anywhere within the system and/or to any other component/system connected to the system. The communications network 146 is wired and/or wireless, for example. The communications network 146 is local and/or global with respect to system 100, for instance.

In some embodiments, system 100 uses a method to achieve data augmentation in anti-malware by decompiling and recompiling binary code with different flags thus producing a different structure. In some embodiments, decompiling binary code is done automatically without human intervention. In other embodiments, the binary code may be decompiled by a user. In other embodiments, system 100 can use a binary code analysis that extracts compilation instructions, then modifies the instructions and recompiles the files. Additionally, system 100 uses a method where machine learning models, for example, based on code trees are used for the same purpose.

In some embodiments, the system 100 enables self-supervised learning of a machine learning algorithm 126 by using data augmentation in malware detection. For example, the system 100 decompiles a file 108 and then recompiles the file with different flags so that the file has a different structure thereby enlarging the data set available to train the machine learning algorithm. That is, in some embodiments, altering a file's binary structure may include decompiling or reverse engineering the binary to reproduce the source code, or obtaining the source by some other means, and recompiling the source code using different compiler options or different compilers. In other embodiments, the system 100 performs binary code analysis, instruction extraction, modification of the extracted instructions, and the recompiling to enlarge the data set available to train the machine learning algorithm 126.

In other embodiments, the system 100 performs binary code analysis, instruction extraction, modification of the extracted instructions, and the recompiling to enlarge the data set 122 available to train the machine learning algorithm 126.

Figure 2:
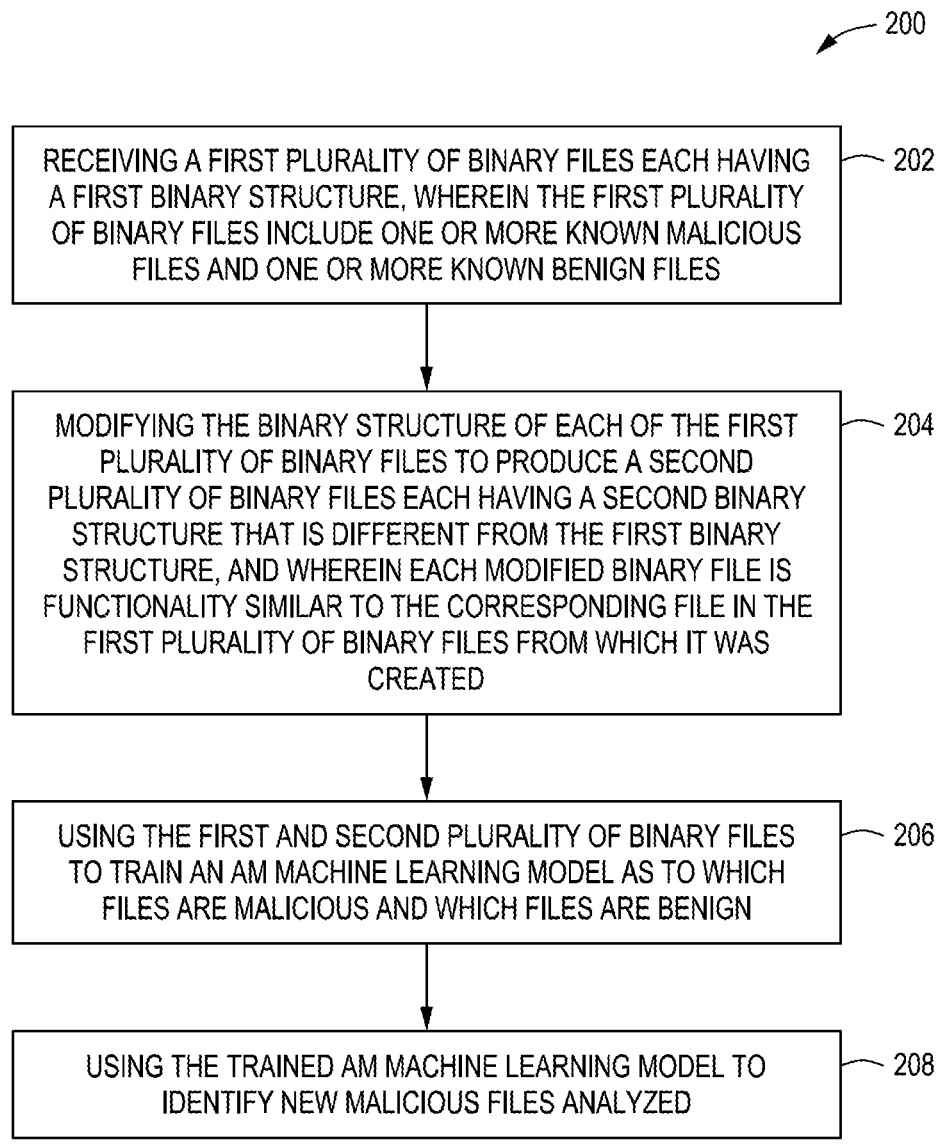
FIG. 2 depicts a flow diagram of a method for data augmentation used in training an anti-malware (AM) machine learning model, in accordance with an embodiment of the present principles.

FIG. 2 is an example process flow diagram of a method 200 for data augmentation used in training an anti-malware (AM) machine learning model, in accordance with an embodiment of the present principles. Such a method 200 may begin at 202 by receiving a first plurality of binary files each having a first binary structure, wherein the first plurality of binary files include one or more known malicious files and one or more known benign files.

At 204, the binary structure of each of the first plurality of binary files is modified to produce a second plurality of binary files each having a second binary structure that is different from the first binary structure. Each modified binary file is functionality similar to the corresponding file in the first plurality of binary files from which it was created. In some embodiments, modifying the binary structure of each of the first plurality of binary files to produce the second plurality of binary files at 204 may include decompiling each of the first plurality of binary files, and recompiling each of the first plurality of binary files to produce the second plurality of binary files each having the second binary structure that is different from the first binary structure. In some embodiments, the recompiling is performed using at least one of different compiler flags, different compiler options, a different compiler, or a different optimization level, than was used in producing the first plurality of binary files. The different optimization level may include at least one of vector instructions, no vector instructions, or any possible type of compiler optimization techniques. In some embodiments, modifying the binary structure of each of the first plurality of binary files to produce the second plurality of binary files at 204 may include extracting binary assembly code from each file in the first plurality of binary files, and modifying the binary assembly code extracted to produce a second file with a second binary structure that is different from the first binary structure of the binary file from which it was created. In some embodiments, modifying the binary structure of each of the first plurality of binary files to produce the second plurality of binary files at 204 may include extracting an execution graph from each file in the first plurality of binary files, and moving decision branches within the execution graph to produce a second file with a second binary structure that is different from the first binary structure of the binary file from which it was created. In some embodiments, modifying the binary structure of each of the first plurality of binary files to produce the second plurality of binary files at 204 may include decompiling each of the first plurality of binary files to produce decompiled code for each binary file, running the decompiled code of each binary file through a second machine learning algorithm that alters the decompiled code, and recompiling the altered decompiled code of each binary file of each of the first plurality of binary files to produce the second plurality of binary files each having the second binary structure that is different from the first binary structure.

At 206, the method 200 then uses the first and second plurality of binary files to train an AM machine learning model as to which files are malicious and which files are benign. At 208, the method 200 then uses the trained AM machine learning model to identify new malicious files analyzed.

The method may additionally include using the larger data set to train a machine learning algorithm on what files are malicious and what files are benign as the larger data set improves the accuracy of the machine learning algorithm compared to training the machine learning algorithm using just the files as originally received at 202. The method also includes providing a report via the input/output device based upon the machine learning algorithm's determination at 208.

FIG. 2 illustrates an example flow diagram representing one or more of the processes as described herein. Each block of the flow diagram may represent a module of code to execute and/or combinations of hardware and/or software configured to perform one or more processes described herein. Though illustrated in a particular order, the following figures are not meant to be so limiting. Any number of blocks may proceed in any order (including being omitted) and/or substantially simultaneously (i.e., within technical tolerances of processors, etc.) to perform the operations described herein.

Figure 3:
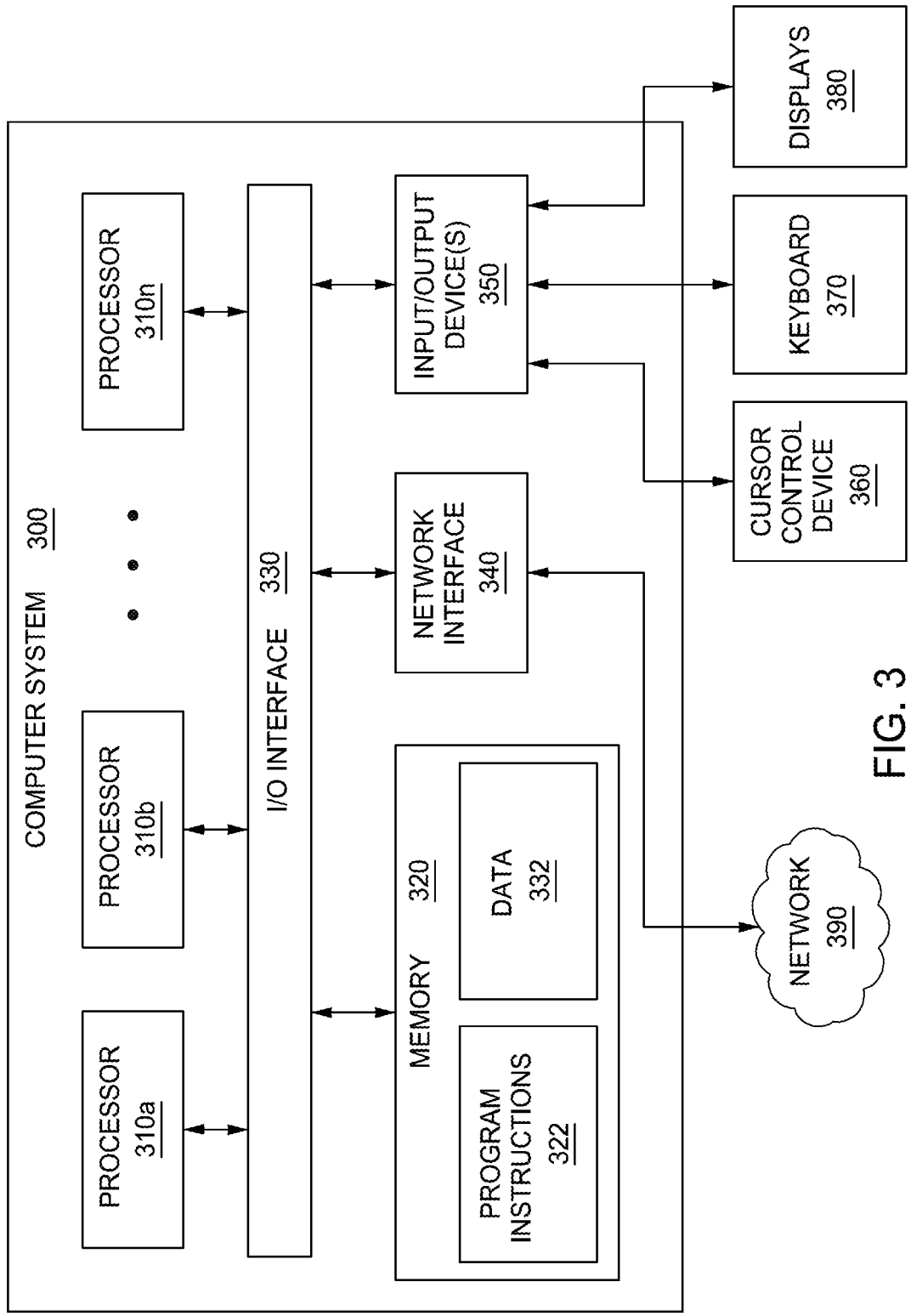
FIG. 3 depicts a high-level block diagram of a computing device suitable for use with embodiments for data augmentation used in training an anti-malware (AM) machine learning model in accordance with the present principles.

FIG. 3 depicts a computer system 300 that can be utilized in various embodiments of the invention to implement the computer and/or the display, according to one or more embodiments.

Various embodiments of method and system for training a computer security algorithm, as described herein, may be executed on one or more computer systems, which may interact with various other devices. One such computer system is computer system 300 illustrated by FIG. 3, which may in various embodiments implement any of the elements or functionality illustrated in FIGS. 1-2. In various embodiments, computer system 300 may be configured to implement methods described above. The computer system 300 may be used to implement any other system, device, element, functionality or method of the above-described embodiments. In the illustrated embodiments, computer system 300 may be configured to implement the method 200 as processor-executable executable program instructions 322 (e.g., program instructions executable by processor(s) 310) in various embodiments.

In the illustrated embodiment, computer system 300 includes one or more processors 310a-310n coupled to a system memory 320 via an input/output (I/O) interface 330. Computer system 300 further includes a network interface 340 coupled to I/O interface 330, and one or more input/output devices 350, such as cursor control device 360, keyboard 370, and display(s) 380. In various embodiments, any of the components may be utilized by the system to receive user input described above. In various embodiments, a user interface may be generated and displayed on display 380. In some cases, it is contemplated that embodiments may be implemented using a single instance of computer system 300, while in other embodiments multiple such systems, or multiple nodes making up computer system 300, may be configured to host different portions or instances of various embodiments. For example, in one embodiment some elements may be implemented via one or more nodes of computer system 300 that are distinct from those nodes implementing other elements. In another example, multiple nodes may implement computer system 300 in a distributed manner.

In different embodiments, computer system 300 may be any of various types of devices, including, but not limited to, a personal computer system, desktop computer, laptop, notebook, tablet or netbook computer, mainframe computer system, handheld computer, workstation, network computer, a camera, a set top box, a mobile device, a consumer device, video game console, handheld video game device, application server, storage device, a peripheral device such as a switch, modem, router, or in general any type of computing or electronic device.

In various embodiments, computer system 300 may be a uniprocessor system including one processor 310, or a multiprocessor system including several processors 310 (e.g., two, four, eight, or another suitable number). Processors 310 may be any suitable processor capable of executing instructions. For example, in various embodiments processors 310 may be general-purpose or embedded processors implementing any of a variety of instruction set architectures (ISAs). In multiprocessor systems, each of processors 310 may commonly, but not necessarily, implement the same ISA.

System memory 320 may be configured to store program instructions 322 and/or data 332 accessible by processor 310. In various embodiments, system memory 320 may be implemented using any suitable memory technology, such as static random-access memory (SRAM), synchronous dynamic RAM (SDRAM), nonvolatile/Flash-type memory, or any other type of memory. In the illustrated embodiment, program instructions and data implementing any of the elements of the embodiments described above may be stored within system memory 320. In other embodiments, program instructions and/or data may be received, sent or stored upon different types of computer-accessible media or on similar media separate from system memory 320 or computer system 300.

In one embodiment, I/O interface 330 may be configured to coordinate I/O traffic between processor 310, system memory 320, and any peripheral devices in the device, including network interface 340 or other peripheral interfaces, such as input/output devices 350. In some embodiments, I/O interface 330 may perform any necessary protocol, timing or other data transformations to convert data signals from one component (e.g., system memory 320) into a format suitable for use by another component (e.g., processor 310). In some embodiments, I/O interface 330 may include support for devices attached through various types of peripheral buses, such as a variant of the Peripheral Component Interconnect (PCI) bus standard or the Universal Serial Bus (USB) standard, for example. In some embodiments, the function of I/O interface 330 may be split into two or more separate components, such as a north bridge and a south bridge, for example. Also, in some embodiments some or all of the functionality of I/O interface 330, such as an interface to system memory 320, may be incorporated directly into processor 310.

Network interface 340 may be configured to allow data to be exchanged between computer system 300 and other devices attached to a network (e.g., network 390), such as one or more external systems or between nodes of computer system 300. In various embodiments, network 390 may include one or more networks including but not limited to Local Area Networks (LANs) (e.g., an Ethernet or corporate network), Wide Area Networks (WANs) (e.g., the Internet), wireless data networks, some other electronic data network, or some combination thereof. In various embodiments, network interface 340 may support communication via wired or wireless general data networks, such as any suitable type of Ethernet network, for example; via digital fiber communications networks; via storage area networks such as Fiber Channel SANs, or via any other suitable type of network and/or protocol.

Input/output devices 350 may, in some embodiments, include one or more display terminals, keyboards, keypads, touchpads, scanning devices, voice or optical recognition devices, or any other devices suitable for entering or accessing data by one or more computer systems 300. Multiple input/output devices 330 may be present in computer system 300 or may be distributed on various nodes of computer system 300. In some embodiments, similar input/output devices may be separate from computer system 300 and may interact with one or more nodes of computer system 300 through a wired or wireless connection, such as over network interface 340.

In some embodiments, the illustrated computer system may implement any of the operations and methods described above, such as the methods illustrated by the flowchart of FIG. 2. In other embodiments, different elements and data may be included.

Those skilled in the art will appreciate that computer system 300 is merely illustrative and is not intended to limit the scope of embodiments. In particular, the computer system and devices may include any combination of hardware or software that can perform the indicated functions of various embodiments, including computers, network devices, Internet appliances, PDAs, wireless phones, pagers, and the like. Computer system 300 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Referring back to FIG. 1, in alternate embodiments, the processor 106 can alter each file's 108 binary structure, where altering a file's binary structure can include decompiling or reverse engineering the binary structure to reproduce sections of the source code or obtaining the sections of the source code by some other means. In some embodiments, along with the source code, the metadata of the sections of the source code can also be decompiled. The sections of the source code can then be swapped between themselves (e.g. first section of the source code with the last section, second section with the second to last section, in random order, etc.). In some embodiments, a file's binary structure can be recompiled while adding to the initial set of the reproduced sections one or more sections of predefined source code lines (e.g. fixed timestamps, base load address, relocation information), or random code lines (e.g., injecting the code with non-operative junk code sections). In some embodiments, a file's binary structure can be recompiled while removing one or more sections of the source code. Alternatively or in addition, in some embodiments, the metadata of the decompiled source code sections can be altered, allowing for changes in section names (e.g. header section, resource section, main section, documentation section, sub-program section), section sizes (e.g. reducing the size of one or more sections by 1, 2, 5, 10, 100 bytes, to predefined size, or removing all data from particular section (resource section)), and/or section offset sizes (i.e., reducing the offset size of one or more sections by 1, 2, 5, 10, 100 address locations, or to predefined size).

In some embodiments, the processor 106 can, alternatively or in addition, alter each file's 108 binary structure by altering decompilation procedures' metadata: import/export table information (e.g., changing the file's name type from lowercase to uppercase, from ordinal to symbolic or vice versa), msdos stub contents, rich header information, digital signature information, overlay data and the like.

In some embodiments, the processor 106 can alter an executable file's 108 binary structure by decompiling or reverse engineering the binary structure to reproduce the source code and recompile the source code using an different type of executable packer (e.g., Armadillo, Crinkler, UPX, VMProtect, etc.) and/or obfuscation technique (e.g. Rename Obfuscation, String Encryption, Control Flow Obfuscation, Instruction Pattern Transformation, Dummy Code Insertion, etc.).

Figure 4:
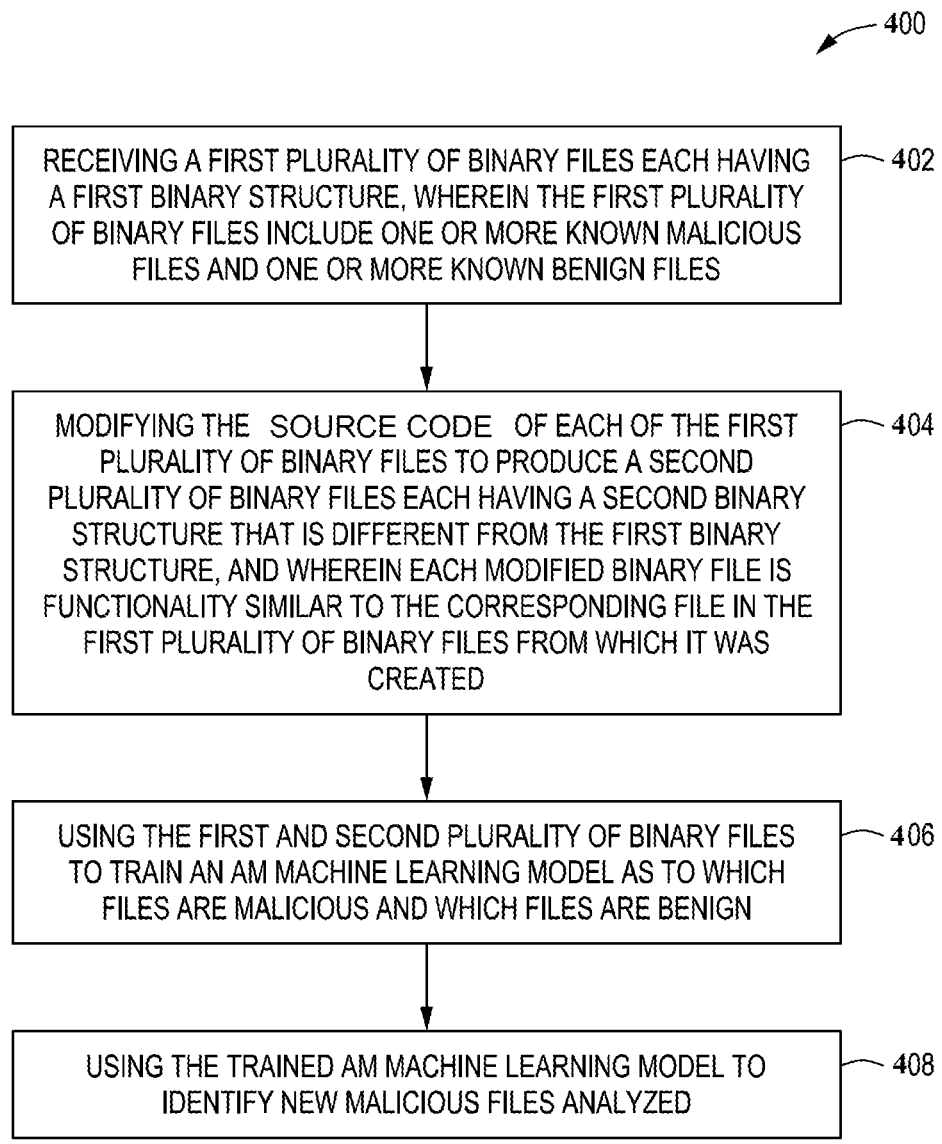
FIG. 4 depicts a flow diagram of an alternate method for data augmentation for use in a training of and application of an anti-malware (AM) machine learning model in accordance with an embodiment of the present principles.

FIG. 4 depicts a flow diagram of an alternate method 400 for data augmentation for use in a training of and application of an anti-malware (AM) machine learning model in accordance with an embodiment of the present principles. The method 400 can begin at 402 during which a first plurality of binary files each having a first binary structure are received, where the first plurality of binary files include one or more known files containing malicious content and one or more known files not containing malicious content. The method 400 can proceed to 404.

At 404, a source code of each of the first plurality of binary files is altered to produce a second plurality of binary files each having a second binary structure that is different from the first binary structure, where each altered binary file is functionality similar to the corresponding file in the first plurality of binary files from which it was produced. The method 400 can proceed to 406.

At 406, the first and second plurality of binary files are used to train the AM machine learning model to distinguish between binary files containing malicious content and binary files not containing malicious content. The method 400 can proceed to 408.

At 408, the trained AM machine learning model is applied to identify unknown binary files containing malicious content. The method 400 can then be exited.

In some embodiments, the method may additionally include swapping sections of the source code of each of the first plurality of binary files to produce the second plurality of binary files each having the second binary structure that is different from the first binary structure. In some other embodiments, the method may additionally include removing one or more sections of the source code of each of the first plurality of binary files to produce the second plurality of binary files each having the second binary structure that is different from the first binary structure. In some yet other embodiments, the method may further include adding source code lines to the source code of each of the first plurality of binary files to produce the second plurality of binary files each having the second binary structure that is different from the first binary structure.

In other embodiments, data augmentation can be achieved by training a machine learning model to modify a binary file structure of a binary file dependent upon a type of binary file received. For example, in some embodiments, the machine learning algorithm 126 can be further trained, by for example the processor 106, to modify a binary file structure of a binary file dependent upon a type of binary file received in accordance with the present principles. Alternatively, a different machine learning algorithm (not shown) can be trained to modify a binary file structure of a binary file dependent upon a type of binary file received in accordance with the present principles.

More specifically, in some embodiments of the present principles, various different types of machine-learned models (or "models") can be trained to modify a binary file structure of a binary file dependent upon a type of binary file received, and the models can be used by the system 100 of FIG. 1. The machine learning models of the present principles can be trained using supervised, semi-supervised, and unsupervised training techniques. The models may be any suitable type of model, including a regression-based model, a decision tree model, a neural network, a convolutional neural network, a deep neural network, a feed forward neural network, and the like. Initially, a predefined base model or a randomized base model can be used to begin the training. The base model can then be trained using training data until the model converges with respect to one or more error conditions. The machine learning models can be trained using training data sets, which may be labeled or unlabeled. The training data sets may correspond to historical data of binary files that have been previously modified in accordance with embodiments of the present principles and/or expert provided data that is generated for purposes of training a model (human-generated and/or machine-generated) that is labeled by one or more experts. Furthermore, in embodiments a machine learning model of the present principles may utilize feedback data with respect to a prediction, classification, or other outcome received with respect to a particular model to reinforce a particular model, whether trained using historical data or generated data.

In some embodiments of the present principles, a machine learning model of the present principles trained to modify a binary structure of binary files can be configured to follow predefined modification rules. For example, in one embodiment and with reference back to the system 100 of FIG. 1, the alteration of each file's 108 binary structure may include the use of an alteration tracking table. The alteration tracking table may include predefined alteration operations, predefined alteration rules and/or predefined alteration methods, for example described in sequential manner, to alter a binary file to reproduce a different but functionally equivalent file. In some embodiments, an alteration tracking table may include the hash of the original binary file as a first value, identifier of an alteration operation, rule, or method as subsequent values, and a hash of the altered file as a last value. In some embodiments, the alteration tracking table may be versioned and saved. The alteration tracking table of the present principles can be used for training a binary file modification model of the present principles.

Figure 5:
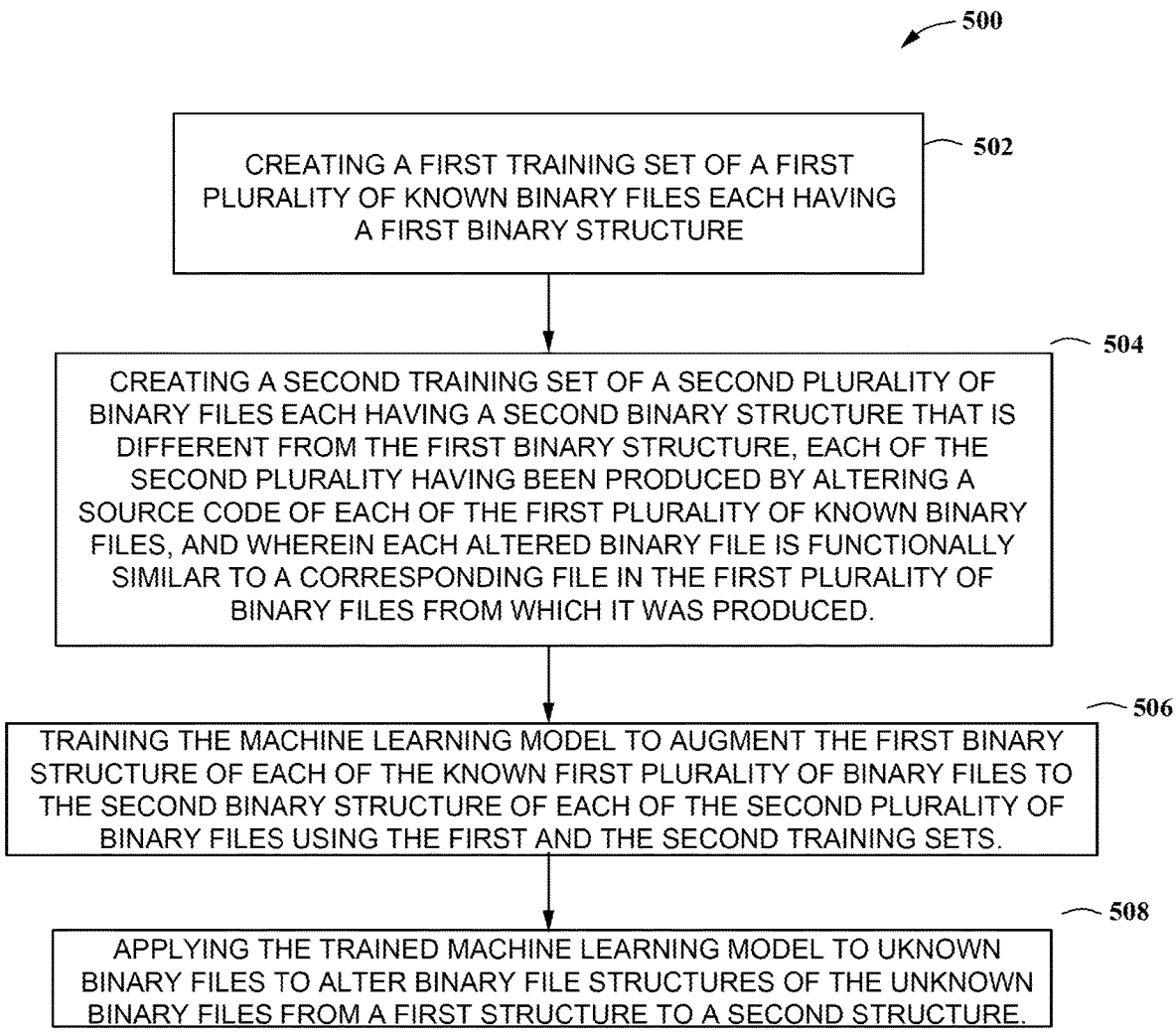
FIG. 5 depicts a flow diagram of a method for training of and application of a machine learning model for data augmentation of binary files in accordance with an embodiment of the present principles.

FIG. 5 depicts a flow diagram of a method 500 for training of and application of a machine learning model for data augmentation of binary files in accordance with an embodiment of the present principles. The method 500 can begin at 502 during which a first training set is created of a first plurality of known binary files each having a first binary structure. The method 500 can proceed to 504.

At 504, a second training set is created of a second plurality of binary files each having a second binary structure that is different from the first binary structure, each of the second plurality of binary files having been produced by altering a source code of each of the first plurality of known binary files, and wherein each altered binary file is functionality similar to a corresponding file in the first plurality of binary files from which it was produced. The method 500 can proceed to 506.

At 506, the machine learning model is trained to augment the first binary structure of each of the known first plurality of binary files to the second binary structure of each of the second plurality of binary files using the first training set and the second training set. The method 500 can proceed to 508.

At 508, the trained machine learning model is applied to unknown binary files to alter binary file structures of the unknown binary files from a first binary structure to a second binary structure. The method 500 can then be exited.

In some embodiments, altering a source code of each of the first plurality of known binary files of the method 500 includes at least one of swapping, adding or removing sections of the source code of each of the first plurality of binary files to produce the second plurality of binary files Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 300 may be transmitted to computer system 300 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium or via a communication medium. In general, a computer-accessible medium may include a storage medium or memory medium such as magnetic or optical media, e.g., disk or DVD/CD-ROM, volatile or non-volatile media such as RAM (e.g., SDRAM, DDR, RDRAM, SRAM, and the like), ROM, and the like.

The methods described herein may be implemented in software, hardware, or a combination thereof, in different embodiments. In addition, the order of methods may be changed, and various elements may be added, reordered, combined, omitted or otherwise modified. All examples described herein are presented in a non-limiting manner. Various modifications and changes may be made as would be obvious to a person skilled in the art having benefit of this disclosure. Realizations in accordance with embodiments have been described in the context of particular embodiments. These embodiments are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

In the foregoing description, numerous specific details, examples, and scenarios are set forth in order to provide a more thorough understanding of the present disclosure. It will be appreciated, however, that embodiments of the disclosure may be practiced without such specific details. Further, such examples and scenarios are provided for illustration, and are not intended to limit the disclosure in any way. Those of ordinary skill in the art, with the included descriptions, should be able to implement appropriate functionality without undue experimentation.

References in the specification to "an embodiment," etc., indicate that the embodiment described may include a particular feature, structure, or characteristic, but every embodiment may not necessarily include the particular feature, structure, or characteristic. Such phrases are not necessarily referring to the same embodiment. Further, when a particular feature, structure, or characteristic is described in connection with an embodiment, it is believed to be within the knowledge of one skilled in the art to affect such feature, structure, or characteristic in connection with other embodiments whether or not explicitly indicated.

Embodiments in accordance with the disclosure may be implemented in hardware, firmware, software, or any combination thereof. Embodiments may also be implemented as instructions stored using one or more machine-readable media, which may be read and executed by one or more processors. A machine-readable medium may include any mechanism for storing or transmitting information in a form readable by a machine (e.g., a computing device or a "virtual machine" running on one or more computing devices). For example, a machine-readable medium may include any suitable form of volatile or non-volatile memory.

Modules, data structures, and the like defined herein are defined as such for ease of discussion and are not intended to imply that any specific implementation details are required. For example, any of the described modules and/or data structures may be combined or divided into sub-modules, sub-processes or other units of computer code or data as may be required by a particular design or implementation.

In the drawings, specific arrangements or orderings of schematic elements may be shown for ease of description. However, the specific ordering or arrangement of such elements is not meant to imply that a particular order or sequence of processing, or separation of processes, is required in all embodiments. In general, schematic elements used to represent instruction blocks or modules may be implemented using any suitable form of machine-readable instruction, and each such instruction may be implemented using any suitable programming language, library, application-programming interface (API), and/or other software development tools or frameworks. Similarly, schematic elements used to represent data or information may be implemented using any suitable electronic arrangement or data structure. Further, some connections, relationships or associations between elements may be simplified or not shown in the drawings so as not to obscure the disclosure.

What is claimed is:

1. A system for data augmentation for use in a training of and application of an anti-malware (AM) machine learning model comprising:
 a processor; and
 a memory coupled to the processor, the memory having stored therein at least one of programs or instructions executable by the processor to configure the system to:
 receive a first plurality of binary files each having a first binary structure, wherein the first plurality of binary files include one or more known files containing malicious content and one or more known files not containing malicious content;
 alter a source code of each of the first plurality of binary files to produce a second plurality of binary files each having a second binary structure that is different from the first binary structure, and wherein each altered binary file is functionality similar to the corresponding file in the first plurality of binary files from which it was produced;

use the first and second plurality of binary files to train the AM machine learning model to distinguish between binary files containing malicious content and binary files not containing malicious content; and apply the trained AM machine learning model to identify unknown binary files containing malicious content.

2. The system of claim 1, wherein altering the source code of each of the first plurality of binary files to produce the second plurality of binary files comprises:

swapping sections of the source code of each of the first plurality of binary files to produce the second plurality of binary files each having the second binary structure that is different from the first binary structure.

3. The system of claim 1, wherein altering the source code of each of the first plurality of binary files to produce the second plurality of binary files comprises:

removing one or more sections of the source code of each of the first plurality of binary files to produce the second plurality of binary files each having the second binary structure that is different from the first binary structure.

4. The system of claim 1, wherein altering the source code of each of the first plurality of binary files to produce the second plurality of binary files includes:

adding source code lines to the source code of each of the first plurality of binary files to produce the second plurality of binary files each having the second binary structure that is different from the first binary structure.

5. The system of claim 4, wherein the added source code lines comprise predefined source code lines including at least one of fixed timestamps, base load address information or relocation information.

6. The system of claim 4, wherein the added source code lines comprise random source code lines including non-operative junk code sections.

7. The system of claim 1, wherein the system is further configured to:

alter metadata of the source code of each of the first plurality of binary files.

8. The system claim 6, wherein each of the first plurality of binary files are altered with a different type of executable application program than a type of executable application program used to alter each of the first plurality of binary files.

9. The system of claim 8, wherein the executable application program used to alter each of the first plurality of binary files comprises at least one of an executable packer including at least one of Armadillo, Crinkler, UPX, or VMProtect, or an obfuscation technique including at least one of Rename Obfuscation, String Encryption, Control Flow Obfuscation, Instruction Pattern Transformation, or Dummy Code Insertion.

10. A method for data augmentation for use in a training of and application of an anti-malware (AM) machine learning model, comprising:

receiving a first plurality of binary files each having a first binary structure, wherein the first plurality of binary files include one or more known files containing malicious content and one or more known files not containing malicious content;

altering a source code of each of the first plurality of binary files to produce a second plurality of binary files each having a second binary structure that is different from the first binary structure, and wherein each altered binary file is functionality similar to the corresponding file in the first plurality of binary files from which it was produced;

using the first and second plurality of binary files to train the AM machine learning model to distinguish between binary files containing malicious content and binary files not containing malicious content; and applying the trained AM machine learning model to identify unknown binary files containing malicious content.

11. The method of claim 10, wherein altering the source code of each of the first plurality of binary files to produce the second plurality of binary files comprises:

swapping sections of the source code of each of the first plurality of binary files to produce the second plurality of binary files each having the second binary structure that is different from the first binary structure.

12. The method of claim 10, wherein altering the source code of each of the first plurality of binary files to produce the second plurality of binary files comprises:

removing one or more sections of the source code of each of the first plurality of binary files to produce the second plurality of binary files each having the second binary structure that is different from the first binary structure.

13. The method of claim 10, wherein altering the source code of each of the first plurality of binary files to produce the second plurality of binary files includes:

adding source code lines to the source code of each of the first plurality of binary files to produce the second plurality of binary files each having the second binary structure that is different from the first binary structure.

14. The method of claim 13, wherein the added source code lines comprise predefined source code lines including at least one of fixed timestamps, base load address information or relocation information.

15. The method of claim 13, wherein the added source code lines comprise random source code lines including non-operative junk code sections.

16. The method of claim 10, wherein the method further comprises:

altering metadata of the source code of each of the first plurality of binary files.

17. The method of claim 10, wherein each of the first plurality of binary files are recompiled with a different type of executable application program than a type of executable application program used to decompile each of the first plurality of binary files.

18. The method of claim 17, wherein the executable application program used to recompile each of the first plurality of binary files comprises at least one of an executable packer including at least one of Armadillo, Crinkler, UPX, or VMProtect, or an obfuscation technique including at least one of Rename Obfuscation, String Encryption, Control Flow Obfuscation, Instruction Pattern Transformation, or Dummy Code Insertion.

19. A method for training of and application of a machine learning model for data augmentation of binary files, comprising:

creating a first training set of a first plurality of known binary files each having a first binary structure;

creating a second training set of a second plurality of binary files each having a second binary structure that is different from the first binary structure, each of the second plurality of binary files having been produced by altering a source code of each of the first plurality of known binary files, and wherein each altered binary file is functionality similar to a corresponding file in the first plurality of binary files from which it was produced;

training the machine learning model to augment the first binary structure of each of the known first plurality of binary files to the second binary structure of each of the second plurality of binary files using the first training set and the second training set; and applying the trained machine learning model to alter binary file structures of unknown binary files from a first binary structure to a second binary structure.

20. The method of claim 19, wherein altering a source code of each of the first plurality of known binary files comprises at least one of swapping, adding or removing sections of the source code of each of the first plurality of binary files to produce the second plurality of binary files.

* * * * *